United States Patent
Xie et al.

(10) Patent No.: US 11,128,382 B2
(45) Date of Patent: Sep. 21, 2021

(54) MULTI-MODULATION-FORMAT COMPATIBLE HIGH-SPEED LASER SIGNAL GENERATION SYSTEM AND METHOD

(71) Applicant: Xi'an Institute of Optics and Precision Mechanics, Chinese Academy of Sciences, Shaanxi (CN)

(72) Inventors: Xiaoping Xie, Shaanxi (CN); Xinning Huang, Shaanxi (CN); Wei Wang, Shaanxi (CN); Tao Duan, Shaanxi (CN); Hui Hu, Shaanxi (CN); Yulong Su, Shaanxi (CN); Duorui Gao, Shaanxi (CN)

(73) Assignee: XI'AN INSTITUTE OF OPTICS AND PRECISION MECHANICS, CHINESE ACADEMY OF SCIENCES, Shaanxi (CN)

( * ) Notice: Subject to any disclaimer, the term of this patent is extended or adjusted under 35 U.S.C. 154(b) by 0 days.

(21) Appl. No.: 17/044,288

(22) PCT Filed: Sep. 13, 2018

(86) PCT No.: PCT/CN2018/105447
§ 371 (c)(1),
(2) Date: Sep. 30, 2020

(87) PCT Pub. No.: WO2020/015109
PCT Pub. Date: Jan. 23, 2020

(65) Prior Publication Data
US 2021/0075514 A1    Mar. 11, 2021

(30) Foreign Application Priority Data
Jul. 19, 2018  (CN) .......................... 201810796244.3

(51) Int. Cl.
 H04B 10/50  (2013.01)
 H04B 10/516  (2013.01)
 H04B 10/556  (2013.01)

(52) U.S. Cl.
 CPC ..... H04B 10/5055 (2013.01); H04B 10/5161 (2013.01); H04B 10/5561 (2013.01)

(58) Field of Classification Search
 CPC ............ H04B 10/5055; H04B 10/5561; H04B 10/5161
 (Continued)

(56) References Cited

U.S. PATENT DOCUMENTS 6,490,069 B1 * 12/2002 Kahn ............... H04B 10/25137
                                                  398/183
7,327,961 B2 *  2/2008 Griffin ................. H04B 10/505
                                                  398/183
(Continued)

FOREIGN PATENT DOCUMENTS

CN    101465692 A      6/2009
CN    104467978 A  *   3/2015  ............. H04B 10/54
(Continued)

*Primary Examiner* — Abbas H Alagheband
(74) *Attorney, Agent, or Firm* — Novick, Kim & Lee, PLLC; Allen Xue

(57) ABSTRACT

The disclosure relates to a multi-modulation-format compatible high-speed laser signal generation system and method. The disclosure can greatly improve modulation format compatibility of a laser communication system and saves system upgrading costs and resource costs. The system mainly includes a control instruction unit, a serial-parallel changeover switch unit, a precoding switch unit, a power control unit, an IQ modulator, a narrow line width laser, and a bias point control unit, wherein the control instruction unit is respectively connected to the serial-parallel changeover switch unit, the precoding switch unit, the power control unit, and the bias point control unit; the serial-parallel (Continued)

changeover switch unit, the precoding switch unit, the power control unit, and the IQ modulator are electrically connected in sequence; the narrow line width laser is connected to an optical input end of the IQ modulator; and the bias point control unit is connected to the IQ modulator.

9 Claims, 3 Drawing Sheets

(58) Field of Classification Search
    USPC .......................................................... 398/188
    See application file for complete search history.

(56) References Cited

U.S. PATENT DOCUMENTS

| | | | | |
|---|---|---|---|---|
| 7,697,803 B2* | 4/2010 | Kershteyn | ............. | H04L 27/364 |
| | | | | 385/24 |
| 8,005,373 B2* | 8/2011 | Katagiri | ................ | H04B 10/66 |
| | | | | 398/204 |
| 8,351,795 B2* | 1/2013 | Nakashima | ........ | H04B 10/5561 |
| | | | | 398/158 |
| 9,337,936 B2* | 5/2016 | Ito | ...................... | H04B 10/5055 |
| 10,236,991 B2* | 3/2019 | Yu | ............................ | H04L 27/36 |
| 2009/0324247 A1* | 12/2009 | Kikuchi | ............... | H04B 10/548 |
| | | | | 398/159 |
| 2010/0215371 A1* | 8/2010 | Djordevia | ......... | H03M 13/6561 |
| | | | | 398/79 |
| 2011/0229149 A1* | 9/2011 | Grubb | ................... | H04B 10/506 |
| | | | | 398/188 |
| 2011/0274430 A1* | 11/2011 | Nakashima | ........... | H04B 10/532 |
| | | | | 398/65 |
| 2013/0230311 A1* | 9/2013 | Bai | ..................... | H04B 10/2507 |
| | | | | 398/9 |
| 2014/0010543 A1* | 1/2014 | Lee | ..................... | H04B 10/615 |
| | | | | 398/79 |
| 2014/0294402 A1* | 10/2014 | Ito | ..................... | H04B 10/5053 |
| | | | | 398/188 |
| 2017/0054513 A1* | 2/2017 | Guo | ....................... | H04L 5/0048 |
| 2017/0078016 A1* | 3/2017 | Roberts | ............ | H04B 10/50597 |

FOREIGN PATENT DOCUMENTS

| | | |
|---|---|---|
| CN | 104467978 A | 3/2015 |
| CN | 104639252 A | 5/2015 |
| WO | 2011137653 A1 | 11/2011 |

* cited by examiner

MULTI-MODULATION-FORMAT COMPATIBLE HIGH-SPEED LASER SIGNAL GENERATION SYSTEM AND METHOD

FIELD

The present disclosure belongs to the field of laser communication, and specifically relates to a multi-modulation-format compatible high-speed laser signal generation system and method.

BACKGROUND

Compared with traditional microwave communication, the data capacity of a laser communication system can be increased by 3-4 orders of magnitude. Therefore, laser communication has been widely used in ground data transmission networks, and the total data throughput of ground backbone communication networks based on laser communication has reached the order of magnitude of Tbit/s ($10^{12}$). Meanwhile, in the field of space data transmission, laser communication has become a link form first considered by countries in the planning of space information network construction in recent years because of its outstanding advantages of high data rate, anti-electromagnetic interference, good confidentiality, etc., and has successively successfully been demonstrated and verified, laying the foundation for the laser transmission of large-capacity interstellar data in the future.

Whether it is ground laser transmission or space laser communication, modulation formats of information are diverse.

A structure of an intensity modulation (IM) system is simple, but requirements for optical power at a receiving end are higher, so that the intensity modulation system is suitable for shorter distance transmission. Binary/differential phase shift keying (BPSK/DPSK) has the advantage of resistance to transmission damage, and the BPSK/DPSK, in cooperation with a balanced detection technology, lowers requirements for optical power by half compared with the receiving end of the IM system, and is a preferred modulation format for long distance transmission. In the face of higher capacity transmission requirements, high-order modulation methods such as quaternary/differential quaternary phase shift keying (QPSK/DQPSK) have the advantages of resistance to transmission damage and high receiving sensitivity at the same time, which are the feature mainly researched in current commercial laser communication. In the past two years, major optical module manufacturers have successively launched QPSK-based 100G or even 400G optical communication modules.

Compared with various communication systems, a single modulation system is only generated by a laser data transmitting terminal in an existing high-speed laser communication system, which limits the compatibility and scalability of laser communication networks. If the generation of a plurality of communication systems needs to be supported, a corresponding number of modulators are required to be stacked, which causes an increase in the cost of the system, such as price, volume, weight, and power consumption (SWAP) to result in a high cost.

SUMMARY

In order to overcome the limited compatibility and poor scalability caused by an existing high-speed laser data transmitting terminal only supporting a single laser communication system, the present disclosure proposes a generation system and method for generation of a high-speed laser signal compatible with mainstream communication systems such as IM, BPSK, DPSK, QPSK and DQPSK, which have the advantages of multi-modulation-format compatible transmission, and small and lightweight system structure, etc., greatly improve modulation format compatibility of a laser communication system, and save the price for system upgrading and the resource cost.

A Specific Technical Solution of the Present Disclosure

The present disclosure provides a multi-modulation-format compatible high-speed laser signal generation system, including a control instruction unit, a serial-parallel changeover switch unit, a precoding switch unit, a power control unit, an in-phase quadrature (IQ) modulator, a narrow line width laser, and a bias point control unit, wherein the control instruction unit is respectively connected to the serial-parallel changeover switch unit, the precoding switch unit, the power control unit, and the bias point control unit, and the serial-parallel changeover switch unit, the precoding switch unit, the power control unit, and the IQ modulator are electrically connected in sequence, the narrow line width laser is connected to an optical input end of the IQ modulator, and the bias point control unit is connected to the IQ modulator.

Further, the system also includes a beam splitter connected to an optical output end of the IQ modulator, wherein a high-speed laser signal output by the IQ modulator is divided into two paths by the beam splitter, where one path of signal is output, and the other path of signal is connected to an input end of the bias point control unit.

Further, the above IQ modulator is composed of two Mach-Zehnder modulators (MZM) connected in parallel in a Mach-Zehnder type, and there is a phase difference of $$\frac{\pi}{2}$$

between upper and lower arms;

the narrow line width laser is a 1550 nm band laser with a line width ≤100 KHz; and the beam splitter is a 1550 nm band optical power beam splitter.

On the basis of the multi-modulation-format compatible high-speed laser signal generation system, a high-speed laser signal generation method using the system is now described. According to a system without a beam splitter and a system with a beam splitter, two methods are provided.

Method 1

[1] a control instruction unit sends corresponding modulation format instructions to a serial-parallel changeover switch unit, a precoding switch unit, a power control unit, and a bias point control unit according to communication requirements;

[2] after receiving the modulation format instruction generated by the control instruction unit, the serial-parallel changeover switch unit performs serial-parallel changeover judgment on an input high-speed electrical signal and then sends a high-speed electrical signal subjected to serial-parallel changeover judgment to the precoding switch unit;

[3] after receiving the modulation format instruction generated by the control instruction unit, the precoding switch unit performs precoding judgment on the high-speed electrical signal generated in the step [2] and then transmits a high-speed electrical signal subjected to precoding judgment to the power control unit;

[4] after receiving the modulation format instruction generated by the control instruction unit, the power control unit performs power control on the high-speed electrical signal generated in the step [3], so that an output electrical signal power is at power level values corresponding to different modulation formats; and

[5] an IQ modulator receives a high-speed electrical signal processed in the step [4] and loads the high-speed electrical signal to a laser signal sent by a narrow line width laser to the IQ modulator, and after receiving the modulation format instruction generated by the control instruction unit, the bias point control unit sends a control signal to the IQ modulator to cause the IQ modulator to perform modulation processing according to a specified modulation format, and finally, a high-speed laser signal with good modulation performance is output.

Method 2

In order to make a control signal more accurate and reliable, a high-speed laser signal output by the IQ modulator needs to be split to form closed-loop control; and the method includes the following specific steps:

steps [1]-[4] are the same as the steps [1]-[4] in Method 1, and step [5] has the following differences:

[5] the IQ modulator receives a high-speed electrical signal processed in the step [4] and loads the high-speed electrical signal to a laser signal sent by the narrow line width laser to the IQ modulator, and a beam splitter divides the laser signal into two paths, where one path of signal is output, and the other path of signal is transmitted to the bias point control unit; and after receiving the modulation format instruction generated by the control instruction unit, the bias point control unit performs feedback control on a bias point of the IQ modulator to cause the IQ modulator to modulate according to a specified modulation format.

The above Method 1 and Method 2 have some same specific processes.

A specific process of the serial-parallel changeover judgment in the above step [2] is as follows:

if QPSK and DQPSK modulation formats are received, the input one path of serial high-speed electrical signal is converted into two parallel electrical signal to be output, and if IM, BPSK and DPSK modulation formats are received, serial-parallel changeover is not required, and the input high-speed electrical signal is transparently transmitted.

A specific process of the precoding judgment in the above step [3] is as follows:

if DPSK and DQPSK modulation formats are received, differential precoding processing is required to be performed on the input high-speed electrical signal, and if IM, BPSK and QPSK modulation formats are received, precoding is not required, and the input high-speed electrical signal is transparently transmitted.

The Beneficial Effects of the Present Disclosure (1) The multi-modulation-format compatible high-speed laser signal generation method and system proposed in the present disclosure greatly improve the sharing efficiency of devices at laser communication transmitting ends, are beneficial to the realization of small and lightweight integration of high-speed laser signal transmitting terminals, and reduce the volume, weight, power consumption and price costs caused by upgrading system performance.

(2) The present disclosure adopts a single IQ modulator in combination with functions such as serial-parallel changeover switch, precoding switch, power control and bias point control, realizes the generation of the high-speed laser signal compatible with 5 mainstream modulation formats such as IM, BPSK, DPSK, QPSK and DQPSK, and greatly enhances the compatibility and scalability of laser communication transmitting ends.

(3) The IQ modulator used in the present disclosure can adaptively modulate a data rate of a loaded high-speed electrical signal, and generated high-speed laser signal data have a rate-adaptive feature, i.e., have the capability of adaptively modulating and transmitting different electrical signal data rates (such as 1.25 Gbit/s, 2.5 Gbit/s or even 10 Gbit/s), so that the compatibility of high-speed laser communication transmission is further enhanced.

DETAILED DESCRIPTION OF THE EMBODIMENTS

Figure 1:
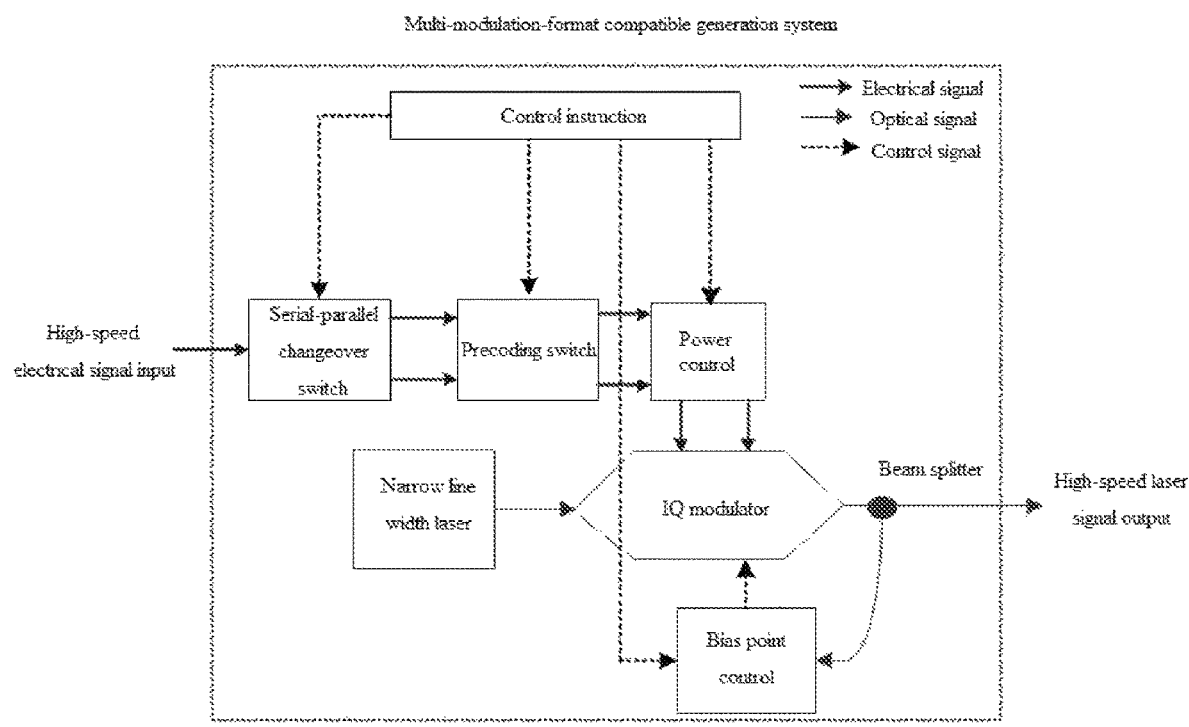
FIG. 1 is a schematic diagram of the principle of the present disclosure.

Referring to FIG. 1, the present disclosure provides a specific embodiment of a multi-modulation-format compatible high-speed laser signal generation system, and the specific structure relationship is as follows.

The system includes a control instruction unit, a serial-parallel changeover switch unit, a precoding switch unit, a power control unit, an IQ modulator, a narrow line width laser, a bias point control unit, and a beam splitter, wherein the control instruction unit is respectively connected to the serial-parallel changeover switch unit, the precoding switch unit, the power control unit, and the bias point control unit;

the serial-parallel changeover switch unit, the precoding switch unit, the power control unit, and the IQ modulator are electrically connected in sequence; the narrow line width laser is connected to an optical input end of the IQ modulator; and the beam splitter, connected to an optical output end of the IQ modulator, divides a high-speed laser signal into two paths, where one path of signal is output, and the other path of signal is connected to the IQ modulator through the bias point control unit.

In addition, what needs to be explained is that a small amount of high-speed laser signals are split by the beam splitter to perform closed-loop feedback control for a control unit in order to improve the control accuracy. In actual use, the beam splitter can also be eliminated, and the IQ modulator can be directly controlled by the bias point control unit.

The IQ modulator in the embodiment is composed of two Mach-Zehnder modulators (MZM) connected in parallel in a Mach-Zehnder type, and there is a phase difference of $$\frac{\pi}{2}$$

between upper and lower arms; the narrow line width laser is a 1550 nm band laser with a line width ≤100 KHz; and the beam splitter is a 1550 nm band optical power beam splitter.

What needs to be emphasized is that main technical indicators of the core component, i.e., the IQ modulator, in the system are as follows.

Figure 2A:
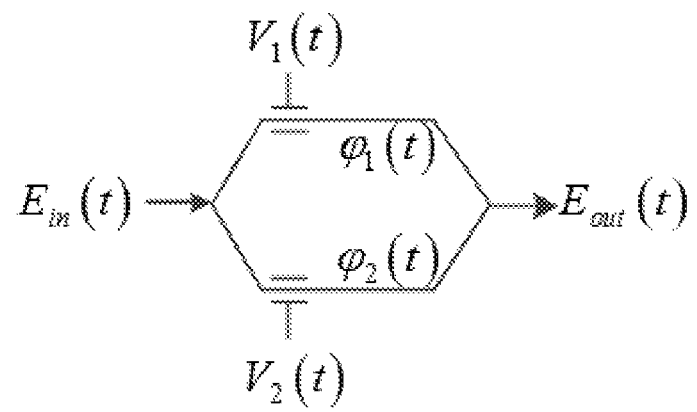
FIG. 2a is a schematic diagram of the principle of an MZM.

As shown in FIG. 2a, when a Mach-Zehnder modulator (MZM) based on a lithium niobate (LiNbO3) crystal produces various code patterns, a refractive index of the LiNbO3 crystal changes on the basis of an electro-optic effect, and a phase size changes with the input voltage, as shown in the following equation:

$$E_{out} = e^{j\theta} E_{in},$$

wherein $E_{in}$ is an input optical field, $E_{out}$ is an output optical field, $$\theta = \pi \left(\frac{V_{in}}{V_\pi}\right),$$

$V_{in}$ is a voltage value of an input electrical signal, and $V_\pi$ is an input voltage value when an optical signal is in $\pi$ phase shift. The MZM divides an input optical wave into two beams with equal power, which are transmitted through two optical waveguides respectively. Since the two optical waveguides are made from electro-optical materials, refractive indexes of the optical waveguides change with a magnitude of an applied voltage, and further two beams of optical signals can have a phase difference at an output end. If an optical path difference between the two beams is an integer multiple of a wavelength, the output end will produce a coherent growth effect; and if the optical path difference of the two beams is a half-integer multiple of an optical wavelength, the output end will produce a coherent cancellation effect. Therefore, a signal can be modulated by controlling the magnitude of the applied voltage.

Supposing that the input optical field $E_{in}(t)$ can be expressed as:

$$E_{in}(t) = |E_0| e^{j\omega_c t},$$

wherein $E_0$ is an amplitude of the input optical field, and $\omega_c$ is a frequency of an optical signal carrier, then an output optical signal $E_{out}(t)$ after modulation of the MZM can be expressed as:

$$E_{out}(t) = \frac{E_{in}(t)}{2}[e^{j\varphi_1(t)} + \gamma e^{j\varphi_2(t)}],$$

wherein $$\gamma = \frac{\sqrt{\delta} - 1}{\sqrt{\delta} + 1}$$

is a splitting ratio of the modulator, and $\delta$ is a DC extinction ratio of the modulator. For an ideal modulator, $\delta$ is infinite, so $\gamma \approx 1$, and then an output optical signal can be written as:

$$E_{out}(t) = E_{in}(t)\cos\left(\frac{\varphi_1(t) - \varphi_2(t)}{2}\right) e^{j\frac{\varphi_1(t)+\varphi_2(t)}{2}}.$$

If input voltage (i.e., driving voltages of two LiNbO3 phase modulators) signals of two modulator arms are $V_1(t)$ and $V_2(t)$, a phase change of the output optical field caused by phase modulation can be expressed as:

$$E_{out}(t) = E_{in}(t)\cos\frac{\pi}{V_\pi}\left(\frac{V_1(t) - V_2(t)}{2}\right) e^{j\frac{\pi}{V_\pi}\left(\frac{V_1(t)+V_2(t)}{2}\right)}.$$

Supposing that $\phi$ is the optical phase difference introduced by the two modulator arms in the case of no driving voltage, an optical signal field strength equation after modulation of the MZM can be obtained as:

$$E_{out}(t) = E_{in}(t)\cos\left[\frac{\pi}{V_\pi}\left(\frac{V_1(t) - V_2(t)}{2}\right) + \phi\right] e^{j\frac{\pi}{V_\pi}\left(\frac{V_1(t)+V_2(t)}{2}\right)},$$

in addition, $V_1(t)=v_1 \cos(2\pi f_0 t)$, and $V_2(t)=v_2 \cos(2\pi f_0 t + \delta)$, wherein $v_1$ and $v_2$ are amplitudes of the driving voltages, $\delta$ is relative phase delay, and $f_0$ is a modulation frequency. In order to prevent chirp during a modulation process, it needs to suppose $V_1(t)=V_2(t)$, which can be achieved by setting $v_1(t)=v_2(t)$ and $\delta=\pi$.

Figure 2B:
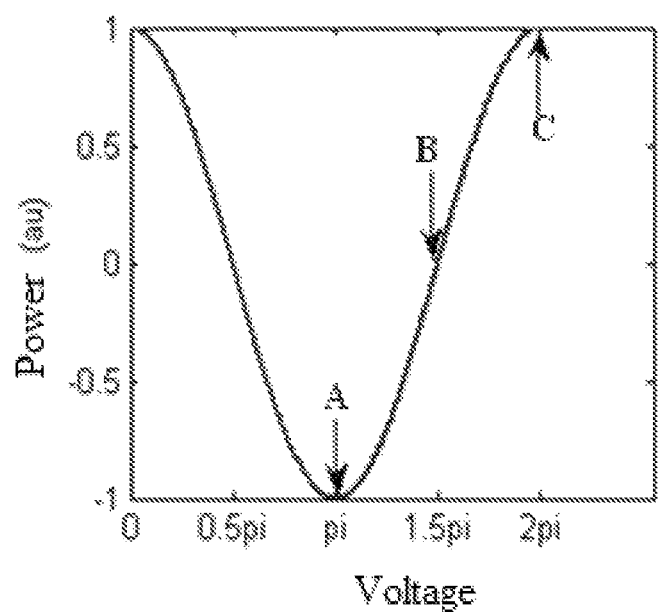
FIG. 2b is a modulation transmission curve diagram of an MZM.

From the above analysis, a modulation transmission curve of the MZM can be obtained. Referring to FIG. 2b, the transmission curve has a lowest point (null point, identified by A), an orthogonal point (identified by B), and a highest point (identified by C).

Figure 2C:
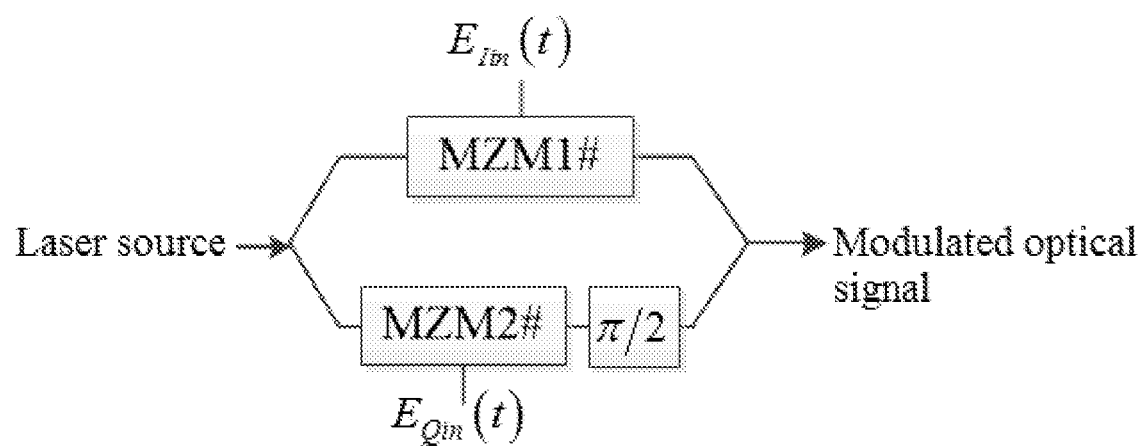
FIG. 2c is a schematic diagram of the principle of an IQ modulator.

Referring to FIG. 2c, the IQ modulator used in the system is composed of two MZMs connected in parallel in a Mach-Zehnder type, and there is a phase difference of $$\frac{\pi}{2}$$

between upper and lower arms.

The Modulation Principle Using the IQ Modulator

An IM format uses a carrier amplitude of a signal element to transmit binary information. The presence or absence of the carrier amplitude represents binary data "1" and "0". In an IM modulation process, the binary data "1" and "0" are directly loaded to the carrier amplitude, and a phase between carriers carrying "1" and "0" does not change. Therefore, in the IM modulation process, only one MZM is needed, and a bias point of the MZM is controlled at an orthogonal point of the MZM, and the required power is $V_\pi$.

A BPSK modulation format uses an absolute carrier phase of a signal element to transmit binary information. Binary data are represented by "0" or "$\pi$" phase of two data bits, and the amplitude and frequency of a signal remain unchanged during the modulation process, but a phase of an optical carrier carrying the binary data is required to be "0" or "$\pi$". When a bias point of the MZM is at a lowest point, an output optical signal will have an additional $\pi$ phase shift compared to an input optical signal, but the power required at the lowest point is higher, being $2V_\pi$.

A DPSK modulation format uses a relative phase, which is "0" or "$\pi$", of a carrier between elements before and after a modulation signal to transmit binary information, which is similar to the BPSK modulation process, so that the MZM is also in a lowest point bias state, and the required power is $2V_\pi$. However, because the relative phase between the elements before and after the modulation signal, the binary data need to be differentially pre-coded during modulation. The pre-coding rule is $d_k = \overline{a_k \oplus d_{k-1}}$, wherein $a_k$ is original data, $d_k$ is coded binary data, and $\oplus$ denotes an exclusive OR logic operation. The original data $a_k = \overline{d_k \oplus d_{k-1}}$ can be decoded using the same rule at a receiving end. A pre-coded data sequence $\{d_k\}$ is modulated to a laser carrier to form an optical signal with the DPSK modulation format.

A QPSK modulation format uses 4 different phases of a carrier to characterize input digital information. Initial phases of a signal are:

$$\frac{\pi}{4}, \frac{3\pi}{4}, \frac{5\pi}{4}, \text{ and } \frac{7\pi}{4}.$$

A QPSK signal is essentially an orthogonal linear combination of two paths of BPSK, so that two MZMs are required. Each MZM is in a lowest point bias state, and the required power is $2V_\pi$. Meanwhile, a phase difference between the two MZMs is $$\frac{\pi}{2},$$

and an IQ modulator can be used to replace the two parallel MZMs with $$\frac{\pi}{2}$$

phase difference.

A DQPSK modulation format also uses a relative phase difference $\Delta\theta$ of elements before and after a modulation signal to represent digital information, and $\Delta\theta$ takes 4 different phase values 0, $$\frac{\pi}{2}, -\frac{\pi}{2},$$

and $\pi$. Similarly, since the relative phase difference between the elements before and after the modulation signal is used, it is necessary to perform differential precoding first during modulation. The coding rules are:

$$u_k = (\overline{I_k \oplus Q_k})(I_k \oplus u_{k-1}) + (I_k \oplus Q_k)(Q_k \oplus v_{k-1})$$

$$v_k = (\overline{I_k \oplus Q_k})(I_k \oplus v_{k-1}) + (I_k \oplus Q_k)(Q_k \oplus u_{k-1})$$

wherein $\oplus$ represents logical exclusive OR, $I_k \in (0,1)$ and $Q_k \in (0,1)$ are raw binary data, $u_k \in (0,1)$ and $v_k \in (0,1)$ are pre-coded binary data, and a DQPSK signal is essentially an orthogonal linear combination of two paths of DPSK, which is similar to the QPSK process.

It can be seen from the above principle that the modulation of a BPSK communication system is similar to that of a DPSK communication system, and the difference is that DPSK requires differential coding of an original electrical signal before modulation. A QPSK communication system is composed of two orthogonal BPSK signals, and a DQPSK communication system is composed of two orthogonal DPSK signals. By using this corresponding relation, the generation of satellite-borne high-speed laser signals compatible with multiple communication systems based on a single IQ modulator can be realized.

According to the description of a structure of the system of the present disclosure and the description of the technical principle of the IQ modulator, a high-speed laser signal generation method using the system is now introduced. The method includes the following steps:

step [1] a control instruction unit selects among five modulation formats: IM, BPSK, DPSK, QPSK, and DQPSK according to communication requirements, and sends corresponding modulation format instructions to a serial-parallel changeover switch unit, a precoding switch unit, a power control unit, and a bias point control unit;

step [2] after receiving the modulation format instruction provided in the step [1], the serial-parallel changeover switch unit performs serial-parallel changeover judgment and processing on an input high-speed electrical signal, wherein a specific process of the serial-parallel changeover judgment and processing is as follows:

if the communication system is one of QPSK and DQPSK, one path of input serial high-speed electrical signal is converted into two paths of parallel electrical signals to be output, and if the communication system is one of IM, BPSK and DPSK, the input high-speed electrical signal is transparently transmitted;

step [3] after receiving the modulation format instruction provided in the step [1], the precoding switch unit performs precoding judgment and processing on a high-speed electrical signal generated in the step [2], wherein a specific process of the precoding judgment and processing is as follows:

if the communication system is one of DPSK and DQPSK, one path of input high-speed electrical signal is pre-coded based on "exclusive OR" logic and then output, and if the communication system is one of IM, BPSK and QPSK, the input high-speed electrical signal is transparently transmitted;

step [4] after receiving the modulation format instruction provided in the step [1], the power control unit performs power control on a high-speed electrical signal generated in the step [3], if the received communication system instruction is IM, the power control unit causes an output electric signal power to be $V_z$, and if the received communication system instruction is one of BPSK, DPSK, QPSK and DQPSK, the power control unit causes the output electric signal power to be $2V_\pi$, wherein $V_\pi$ is a half-wave voltage value of the IQ modulator;

step [5] the IQ modulator loads a high-speed electrical signal generated in the step [4] to a 1550 nm band laser output by a narrow line width laser to form and output a 1550 nm band high-speed laser signal; and step [6] after receiving the modulation format instruction provided in the step [1], the bias point control unit uses the power of the high-speed laser signal generated in the step [5] as a reference value to perform feedback control on a bias point of the IQ modulator. Referring to FIGS. 2a-2c and Table 1 for the feedback control process.

If the received modulation format instruction is IM, the bias point control unit causes an MZM1# in the IQ modulator to be at an orthogonal point B of the transmission curve, and an MZM2# is suspended;

if the received modulation format instruction is one of BPSK and DPSK, the bias point control unit causes the MZM1# in the IQ modulator to be at a lowest point A of the transmission curve, and the MZM2# is suspended; and if the received modulation format instruction is one of QPSK and DQPSK, the bias point control unit causes the MZM1# and MZM2# in the IQ modulator to be at the lowest point A of the transmission curve; and the above bias point control process ensures that the IQ modulator outputs the 1550 nm band high-speed laser signal with good modulation performance in accordance with a specified modulation format.

TABLE 1

| No. | Communication System | Bias Point Control Unit Value | Power Control Unit Value |
|---|---|---|---|
| 1 | IM | MZM1#-orthogonal point MZM2#-suspended | $V_\pi$ |
| 2 | BPSK | MZM1#-lowest point MZM2#-suspended | $2V_\pi$ |
| 3 | DPSK | MZM1#-lowest point MZM2#-suspended | $2V_\pi$ |
| 4 | QPSK | MZM1#-lowest point MZM2#-lowest point | $2V_\pi$ |
| 5 | DQPSK | MZM1#-lowest point MZM2#-lowest point | $2V_\pi$ |

It can be seen that through combination of different control parameters, generation of a high-speed laser signal compatible with five communication systems of IM, BPSK, DPSK, QPSK and DQPSK is realized.

The above embodiments show that the multi-modulation-format compatible small lightweight high-speed laser signal transmission solution provided by the present disclosure realizes the generation of the high-speed laser signal compatible with five modulation formats of IM, BPSK, DPSK, QPSK and DQPSK. By the combination of different control parameters, the sharing rate of core devices is greatly increased, the modulation format compatibility of the high-speed laser communication system is expanded, and the complexity of system implementation and the number of devices are effectively reduced, not only can the compatibility and scalability of the system be ensured, but also the existing system upgrading costs and resource costs are saved.

The invention claimed is:

1. A multi-modulation-format compatible laser signal generation system, comprising: a control instruction unit, a serial-parallel changeover switch unit, a precoding switch unit, a power control unit, an IQ modulator, a narrow line width laser, and a bias point control unit, wherein
   the control instruction unit is electrically connected to the serial-parallel changeover switch unit, the precoding switch unit, the power control unit, and the bias point control unit; and
   the serial-parallel changeover switch unit, the precoding switch unit, the power control unit, and the IQ modulator are electrically connected in sequence, the narrow line width laser is connected to an optical input end of the IQ modulator, and the bias point control unit is electrically connected to the IQ modulator,
   wherein the control instruction unit is configured to specify a modulation format selected from intensity modulation (IM), binary phase shift keying (BPSK), differential phase shift keying (DPSK), quaternary phase shift keying (QPSK), and differential quaternary phase shift keying (DQPSK), and
   wherein the laser signal generation system is configured to perform IM, BPSK, DPSK, QPSK, and DQPSK.

2. The multi-modulation-format compatible laser signal generation system according to claim 1, further comprising a beam splitter connected to an optical output end of the IQ modulator, wherein, during operation, the beam splitter splits a laser into to two laser beams.

3. The multi-modulation-format compatible laser signal generation system according to claim 2, wherein the IQ modulator is a Mach-Zehnder modulator comprising two MZMs connected in parallel and a phase difference between an upper arm and a lower arm of IQ modulator is $$\frac{\pi}{2},$$

and;
   wherein the narrow line width laser is a 1550 nm band laser with a line width <100 KHz and the beam splitter is a 1550 nm band optical power beam splitter.

4. A method for generating a laser signal using a system that comprises a control instruction unit, a serial-parallel changeover switch unit, a precoding switch unit, a power control unit, an IQ modulator, a narrow line width laser, and a bias point control unit, the method comprising:
   [1] generating a modulation format instruction that specifies a modulation format of the laser signal; sending the modulation format instruction to flail the serial-parallel changeover switch unit, the precoding switch unit, the power control unit, and the bias point control unit;
   according to the specified modulation format, performing a serial-parallel changeover judgment on an input electrical signal in the serial-parallel changeover switch unit to produce a first electrical signal and sending the first electrical signal to the precoding switch unit;
   according to the specified modulation format, performing a precoding judgment on the first output electrical signal in the precoding switch unit to produce a second electrical signal, and sending the second electrical signal to the power control unit;
   according to the specified modulation format, performing power control on the second electrical signal in the power control unit so as to output a third electrical signal at a power level corresponding to the modulation format; and
   sending the third electrical signal to the IQ modulator, applying the third electrical signal to a laser signal from a narrow line width laser, and sending a control signal to the IQ modulator from the bias point control unit to cause the IQ modulator to perform modulation processing according to the specified modulation format, and outputting the laser signal.

5. The method according to claim 4, wherein, in the step, when the modulation format is QPSK or DQPSK, converting the input serial electrical signal into the first output electrical signal having two parallel electrical signals, and when the modulation format is IM, BPSK, or DPSK, transmitting the input serial electrical signal without conversion.

6. The method according to claim 4, wherein, in the step, when the modulation format is DPSK or DQPSK, performing differential precoding processing on the first output electrical signal; and
   when the modulation format is IM, BPSK or QPSK, transmitting the first output electrical signal without precoding.

7. A method according to claim 4, wherein the system further comprises a beam splitter connected to the IQ modulator, and the method further comprises:
   splitting the laser signal from by the IQ modulator into two laser beams in beam splitter, and sending one of the two laser beams to the bias point control unit.

8. The method according to claim 4, wherein
the IQ modulator is a Mach-Zehnder modulator comprising two MZMs connected in parallel, and the method comprises adjusting the third electrical signal applied to the laser signal from a narrow line width laser so that a phase difference between an upper arm and a lower arm of IQ modulator is $$\frac{\pi}{2}.$$

9. The method according to claim 7, wherein the narrow line width laser is a 1550 nm band laser with a line width <100 KHz and the beam splitter is a 1550 nm band optical power beam splitter.

* * * * *